US009807607B2

(12) United States Patent
Velusamy

(10) Patent No.: US 9,807,607 B2
(45) Date of Patent: Oct. 31, 2017

(54) SECURE REMOTE USER DEVICE UNLOCK

(71) Applicant: T-Mobile USA, Inc., Bellevue, WA (US)

(72) Inventor: Senthil Kumar Mulluppadi Velusamy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/569,531

(22) Filed: Dec. 12, 2014

(65) Prior Publication Data
US 2016/0100309 A1   Apr. 7, 2016

Related U.S. Application Data

(60) Provisional application No. 62/059,818, filed on Oct. 3, 2014.

(51) Int. Cl.
*H04L 29/06* (2006.01)
*H04W 12/04* (2009.01)
(Continued)

(52) U.S. Cl.
CPC ......... *H04W 12/04* (2013.01); *H04L 9/0816* (2013.01); *H04W 4/001* (2013.01); *H04W 12/08* (2013.01);
(Continued)

(58) Field of Classification Search
None
See application file for complete search history.

(56) References Cited

U.S. PATENT DOCUMENTS 6,226,749 B1   5/2001  Carloganu et al.
6,317,836 B1  11/2001  Goren et al.
(Continued)

FOREIGN PATENT DOCUMENTS

CN    CN1331371 C    8/2007
CN    101398872 A    4/2009
(Continued)

OTHER PUBLICATIONS

Computer Desktop Encyclopedia definition of "processor": http://lookup.computerlanguage.com/host_app/search?cid=C999999&term=processor&lookup.x=0&lookup.y=0.*
(Continued)

*Primary Examiner* — Jeremiah Avery
(74) *Attorney, Agent, or Firm* — Han Santos, PLLC; Elliott Y. Chen

(57) ABSTRACT

A device unlock application on a user device may interact with a server to automatically carrier unlock the user device. The server may receive a carrier unlock request for a user device. The server may determine one or more verifications to be performed based at least on a unlock scenario requested by the carrier unlock request. The server may perform the one or more verifications to determine whether the user device is eligible for a carrier unlock. The server may send a unlock command to the user device in response to determining that the user device is eligible for the carrier unlock. The unlock command may disable a comparison of a device carrier code of the user device to a subscriber identity module (SIM) carrier code stored in a SIM card of the user device.

20 Claims, 7 Drawing Sheets

(51) Int. Cl.
  *H04L 9/08* (2006.01)
  *H04W 4/00* (2009.01)
  *H04W 12/08* (2009.01)
  *H04M 15/00* (2006.01)
(52) U.S. Cl.
  CPC .... *H04L 2209/24* (2013.01); *H04L 2463/062* (2013.01); *H04M 15/47* (2013.01)

(56) References Cited

U.S. PATENT DOCUMENTS

| | | | |
|---|---|---|---|
| 6,321,079 B1 | 11/2001 | Cooper | |
| 6,327,660 B1 | 12/2001 | Patel | |
| 7,266,371 B1* | 9/2007 | Amin | H04W 8/18 455/418 |
| 7,689,204 B2 | 3/2010 | Dupuis et al. | |
| 7,783,281 B1 | 8/2010 | Cook et al. | |
| 8,321,916 B2 | 11/2012 | Aissi et al. | |
| 8,463,239 B1* | 6/2013 | Koller | H04M 1/72519 455/410 |
| 8,650,616 B2* | 2/2014 | Chan | G06F 21/60 726/1 |
| 8,666,366 B2* | 3/2014 | Deatley | H04L 63/08 455/410 |
| 9,055,443 B2 | 6/2015 | Froelich et al. | |
| 9,172,538 B2 | 10/2015 | Obaidi | |
| 9,319,884 B2 | 4/2016 | Buzescu et al. | |
| 9,426,661 B2 | 8/2016 | Obaidi | |
| 9,591,484 B2 | 3/2017 | Ionescu et al. | |
| 2004/0242209 A1* | 12/2004 | Kruis | H04W 4/001 455/414.1 |
| 2005/0172135 A1 | 8/2005 | Wiersma | |
| 2006/0075259 A1 | 4/2006 | Bajikar et al. | |
| 2007/0154014 A1 | 7/2007 | Aissi et al. | |
| 2007/0180269 A1 | 8/2007 | Irish et al. | |
| 2007/0264990 A1 | 11/2007 | Droste et al. | |
| 2008/0090614 A1 | 4/2008 | Sicher et al. | |
| 2008/0125084 A1 | 5/2008 | Cambois et al. | |
| 2008/0132226 A1 | 6/2008 | Carnall | |
| 2008/0209206 A1 | 8/2008 | Vaha-Sipila et al. | |
| 2008/0212781 A1 | 9/2008 | Vennelakanti et al. | |
| 2008/0229092 A1 | 9/2008 | Dale et al. | |
| 2008/0282084 A1 | 11/2008 | Hatakeyama | |
| 2008/0307494 A1 | 12/2008 | Holtzman et al. | |
| 2009/0083858 A1 | 3/2009 | Jennings et al. | |
| 2009/0158419 A1 | 6/2009 | Boyce | |
| 2009/0165119 A1 | 6/2009 | Ramanath | |
| 2009/0181662 A1* | 7/2009 | Fleischman | H04W 8/183 455/419 |
| 2009/0270126 A1 | 10/2009 | Liu | |
| 2009/0305668 A1* | 12/2009 | Ahn | H04W 12/06 455/410 |
| 2009/0325646 A1 | 12/2009 | Stewart et al. | |
| 2010/0009659 A1* | 1/2010 | Netanel | H04L 63/06 455/411 |
| 2010/0082968 A1 | 4/2010 | Beverly | |
| 2010/0222047 A1* | 9/2010 | Vanderlinden | H04W 8/245 455/418 |
| 2010/0263043 A1 | 10/2010 | Xu | |
| 2010/0273452 A1 | 10/2010 | Rajann et al. | |
| 2010/0299744 A1 | 11/2010 | Mardiks | |
| 2011/0076986 A1* | 3/2011 | Glendinning | G06F 21/88 455/411 |
| 2011/0081889 A1 | 4/2011 | Gao et al. | |
| 2011/0130118 A1 | 6/2011 | Fan et al. | |
| 2011/0154030 A1 | 6/2011 | Hazra et al. | |
| 2011/0159843 A1 | 6/2011 | Heath et al. | |
| 2011/0177842 A1 | 7/2011 | Prendergast et al. | |
| 2011/0212706 A1 | 9/2011 | Uusilehto | |
| 2011/0307711 A1 | 12/2011 | Novak et al. | |
| 2012/0042376 A1 | 2/2012 | Dolgunov et al. | |
| 2012/0042396 A1 | 2/2012 | Guerra et al. | |
| 2012/0058743 A1 | 3/2012 | Chen | |
| 2012/0083242 A1 | 4/2012 | Spitz et al. | |
| 2012/0101941 A1 | 4/2012 | Kang et al. | |
| 2012/0221955 A1* | 8/2012 | Raleigh | H04M 15/00 715/736 |
| 2012/0260095 A1 | 10/2012 | Hauck et al. | |
| 2012/0304255 A1* | 11/2012 | Carnes | H04L 9/3234 726/3 |
| 2012/0309348 A1* | 12/2012 | De Atley | H04L 63/08 455/410 |
| 2013/0122864 A1 | 5/2013 | Haggerty et al. | |
| 2013/0210389 A1 | 8/2013 | Obaidi | |
| 2013/0304616 A1 | 11/2013 | Raleigh et al. | |
| 2013/0305047 A1* | 11/2013 | Xi | H04L 63/0428 713/168 |
| 2014/0038556 A1 | 2/2014 | Sousa | |
| 2014/0057597 A1 | 2/2014 | Velusamy et al. | |
| 2014/0075567 A1* | 3/2014 | Raleigh | H04W 12/10 726/26 |
| 2015/0106456 A1 | 4/2015 | Hoek | |
| 2016/0029220 A1 | 1/2016 | Obaidi | |
| 2016/0154982 A1 | 6/2016 | Velusamy et al. | |
| 2017/0085546 A1 | 3/2017 | Velusamy et al. | |

FOREIGN PATENT DOCUMENTS

| | | |
|---|---|---|
| CN | 104081403 B | 10/2014 |
| CN | 104335619 A | 2/2015 |
| EP | 1359733 A1 | 11/2003 |
| EP | 2063378 A2 | 5/2009 |
| EP | 2839687 A1 | 2/2015 |
| EP | 2839690 A1 | 2/2015 |
| EP | 2771833 | 6/2015 |
| WO | WO2004063871 A2 | 7/2004 |
| WO | WO2008077628 A2 | 7/2008 |
| WO | 2013063353 A1 | 5/2013 |
| WO | 2013158977 A1 | 10/2013 |
| WO | 2013158999 A1 | 10/2013 |
| WO | 20130158971 A1 | 10/2015 |
| WO | 20160053498 A1 | 4/2016 |

OTHER PUBLICATIONS

Becher, Michael; Freiling, Felix C.; Hoffman, Johannes; Holz, Thorsten; Uellenbeck, Sebastian; Wolf, Christopher. Mobile Security Catching Up? Revealing the Nuts and Bolts of the Security of Mobile Devices. 2011 IEEE Symposium on Security and Privacy. http://ieeexplore.ieee.org/stamp/stamp.jsp?arnumber=5958024.*

Yeung, Kwan L.; Yum, Tak-Shing P. Performance analysis of borrowing with directional carrier locking strategy in cellular radio systems. 1995 IEEE International Conference on Communications, ICC '95 Seattle, 'Gateway to Globalization'. http://ieeexplore.ieee.org/stamp/stamp.jsp?arnumber=524511.*

Decker, Christian; Nguissi, Serge; Haller, Jochen; Kilian-Kehr, Roger. Proximity as a Security Property in a Mobile Enterprise Application Context. Proceedings of the 37th Annual Hawaii International Conference on System Sciences, 2004. http://ieeexplore.ieee.org/stamp/stamp.jsp?arnumber=1265451.*

R, Vijayendra; G, Srinivasa, K. Identifying Objects Using RF Transmitters and Receivers, and Retrieving Data Using GSM. 2010 The 2nd International Conference on Computer and Automationi Engineering (ICCAE). http://ieeexplore.ieee.org/stamp/stamp.jsp?arnumber=5451944.*

Becher, Michael et al. Mobile Security Catching Up? Revealing the Nuts and Bolts of the Security of Mobile Devices. 2011 IEEE Symposium on Security and Privacy (SP). http://ieeexplore.ieee.org/stamp/stamp.jsp?arnumber=5958024.*

R, Vijayendra; K, Srinivasa G. Identifying Objects Using RF Transmitters and Receivers, and Retrieving Data Using GSM. 2010 The 2nd International Conference on Computer and Automation Engineering (ICCAE). http://ieeexplore.ieee.org/stamp/stamp.jsp?arnumber=5451944.*

"International Search Report and Written Opinion" for PCT/US2015/046258 mailed Feb. 19, 2016, 10 pages.

"Office Action for U.S. Appl. No. 13/660,350", Mailed Date: Aug. 7, 2014, Froelich, et al., "Mobile Device-Type Locking", 8 pages.

(56) References Cited

OTHER PUBLICATIONS

"Final Office Action for U.S. Appl. No. 13/660,350", Mailed Date: Jan. 13, 2014, Obaidi, "Mobile Device-Type Locking", 8 pages.
"PCT Search Report and Written Opinion for PCT Application No. PCT/US2013/037381", Mailed Date: Sep. 17, 2013, 11 pages.
Lee, et al., "A New Delegation-Based Authentication Protocol for Use in Portable Communication Systems", IEEE Transactions on Wireless Communications, vol. 4, No. 1, Jan. 2005, pp. 57-64.
"Office Action for U.S. Appl. No. 13/660,350", Mailed Date: Jul. 22, 2013, Obaidi, "Mobile Device-Type Locking", 8 pages.
"PCT Search Report and Written Opinion for PCT Application No. PCT/US2013/037345", Mailed Date: Jul. 1, 2013, 10 pages.
"PCT Search Report and Written Opinion for PCT Application No. PCT/US2013/037332", Mailed Date: Jul. 30, 2013, 13 pages.
"PCT Search Report and Written Opinion for PCT Application No. PCT/US2012/062050", Mailed Date: Jan. 17, 2013, 10 pages.
"Office Action for U.S. Appl. No. 13/840,045", Mailed Date: Jul. 30, 2014, Obaidi, "Remote Unlocking of Telecommunication Device Functionality", 12 pages.
"Final Office Action for U.S. Appl. No. 13/840,045", Mailed Date: Nov. 17, 2014, Obaidi, "Remote Unlocking of Telecommunication Device Functionality", 12 pages.
"Chinese Office Action" for Chinese Patent Application No. 201280053062.8, dated Feb. 26, 2016, 10 pages.
"European Search Report" for EP Patent Application No. 12843678.9, dated May 20, 2015, 8 pages.
"European Search Report" for EP Patent Application No. 13778691.9, dated Nov. 27, 2015, 9 pages.
"European Search Report" for EP Patent Application No. 13778922.8, dated Nov. 11, 2015, 6 pages.
"Notice of Allowance" for U.S. Appl. No. 13/660,350, dated Nov. 26, 2014, 12 pages.
"Office Action" for U.S. Appl. No. 13/796,550, dated Jan. 26, 2015, 29 pages.
"Final Office Action" for U.S. Appl. No. 13/796,550, dated May 13, 2015, 22 pages.
"Office Action" for U.S. Appl. No. 13/796,550, dated Jan. 11, 2016, 33 pages.
"Final Office Action" for U.S. Appl. No. 13/796,550, dated May 23, 2016, 27 pages.
"Office Action" for U.S. Appl. No. 13/796,550, dated Nov. 10, 2016, 27 pages.
"Final Office Action" for U.S. Appl. No. 13/796,550, dated Mar. 29, 2017, 25 pages.
"Office Action" for U.S. Appl. No. 13/839,189, dated Feb. 24, 2015, 37 pages.
"Final Office Action" for U.S. Appl. No. 13/839,189, dated Aug. 21, 2015, 16 pages.
"Office Action" for U.S. Appl. No. 13/839,189, dated Dec. 23, 2015, 19 pages.
"Final Office Action" for U.S. Appl. No. 13/839,189, dated Jul. 11, 2016, 19 pages.
"Notice of Allowance" for U.S. Appl. No. 13/839,189, dated Oct. 24, 2016, 16 pages.
"Notice of Allowance" for U.S. Appl. No. 13/840,045, dated Feb. 18, 2015, 8 pages.
"Office Action" for U.S. Appl. No. 13/840,045, dated Jul. 29, 2015, 15 pages.
"Notice of Allowance" for U.S. Appl. No. 13/840,045; dated Dec. 10, 2015, 11 pages.
"Notice of Allowance" for U.S. Appl. No. 13/840,045, dated Feb. 1, 2016, 10 pages.
"Notice of Allowance" for U.S. Appl. No. 13/840,045, dated Mar. 17, 2016, 6 pages.
"Office Action" for U.S. Appl. No. 13/842,116, dated Jan. 27, 2015, 28 pages.
"Notice of Allowance" for U.S. Appl. No. 13/842,116, dated Jun. 12, 2015, 12 pages.
"Notice of Allowance" for U.S. Appl. No. 13/842,116, dated Sep. 30, 2015, 8 pages.
"Office Action" for U.S. Appl. No. 14/795,850, dated Sep. 9, 2016, 19 pages.
"Final Office Action" for U.S. Appl. No. 14/795,850, dated Mar. 9, 2017, 19 pages.
"Office Action" for U.S. Appl. No. 14/856,742, dated Mar. 27, 2017, 12 pages.
"Office Action" for U.S. Appl. No. 14/874,023, dated Dec. 21, 2015, 16 pages.
"Notice of Allowance" for U.S. Appl. No. 14/874,023, dated Apr. 7, 2016, 11 pages.
"Chinese Office Action" for Chinese Patent Application No. 201380020694.9, dated Jun. 2, 2017, 18 pages.
"Chinese Office Action" for Chinese Patent Application No. 201280053062.8, dated Feb. 26, 2016, 23 pages.

* cited by examiner

SECURE REMOTE USER DEVICE UNLOCK

CROSS REFERENCE TO RELATED PATENT APPLICATION

This patent application claims priority from U.S. Provisional Application No. 62/059,818, filed Oct. 3, 2014, which application is hereby incorporated in its entirety by reference.

BACKGROUND

Mobile communication devices, such as smartphones, are often carrier-locked to wireless communication carriers. Many wireless communication carriers lock mobile communication devices to their cellular networks to prevent fraud. For example, an unlocked mobile communication device may be stolen and resold for use with a new subscriber identification module (SIM) card at minimal risk of detection. In another example, a malicious user may use a false identity to purchase a mobile communication device at a carrier subsidized price, in which the carrier subsidized price is provide in exchange for a termed service contract. The malicious user may subsequently fail to activate the mobile communication device with the wireless communication carrier. Instead, the malicious user may sell the mobile communication device to a third-party buyer for a profit. Since a wireless communication carrier relies on the termed service contract to recoup the initial subsidy provided to the malicious user, such fraudulent activity may cause the wireless communication carrier to suffer a loss.

However, wireless communication carriers may carrier unlock mobile communication devices for eligible customers upon request. For example, a wireless communication carrier may unlock a mobile communication device after a customer has completed the termed service contract. In order to distinguish between carrier unlock requests of eligible customers and non-eligible customers, wireless communication carriers may use customer service representatives as gatekeepers. Upon receive a carrier unlock request from a customer for a mobile communication device, a customer service representative may initiate a review to ascertain whether the customer is eligible to have the mobile communication device unlocked. Following successful verification, the customer service representative may subsequently provide a unlock code to the customer for unlocking the mobile communication device. The customer then enters the unlock code into the mobile communication device at the appropriate user input interface to unlock the device. In some instances, the verification of eligibility by a customer service representative for a carrier unlock may take as long as three days.

The duration of such unlock eligibility verification may result in poor customer experience. Further, such unlock eligibility verification may be overly burdensome when the customer is requesting a partial unlock of a mobile communication device, such as unlocking the wireless communication for use with a foreign mobile carrier while traveling aboard. Additionally, since mobile communication devices of a particular manufacturer and model may share a common unlock code, a malicious user may use a unlock code to unlock other mobile communication devices that are otherwise ineligible to be unlocked.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
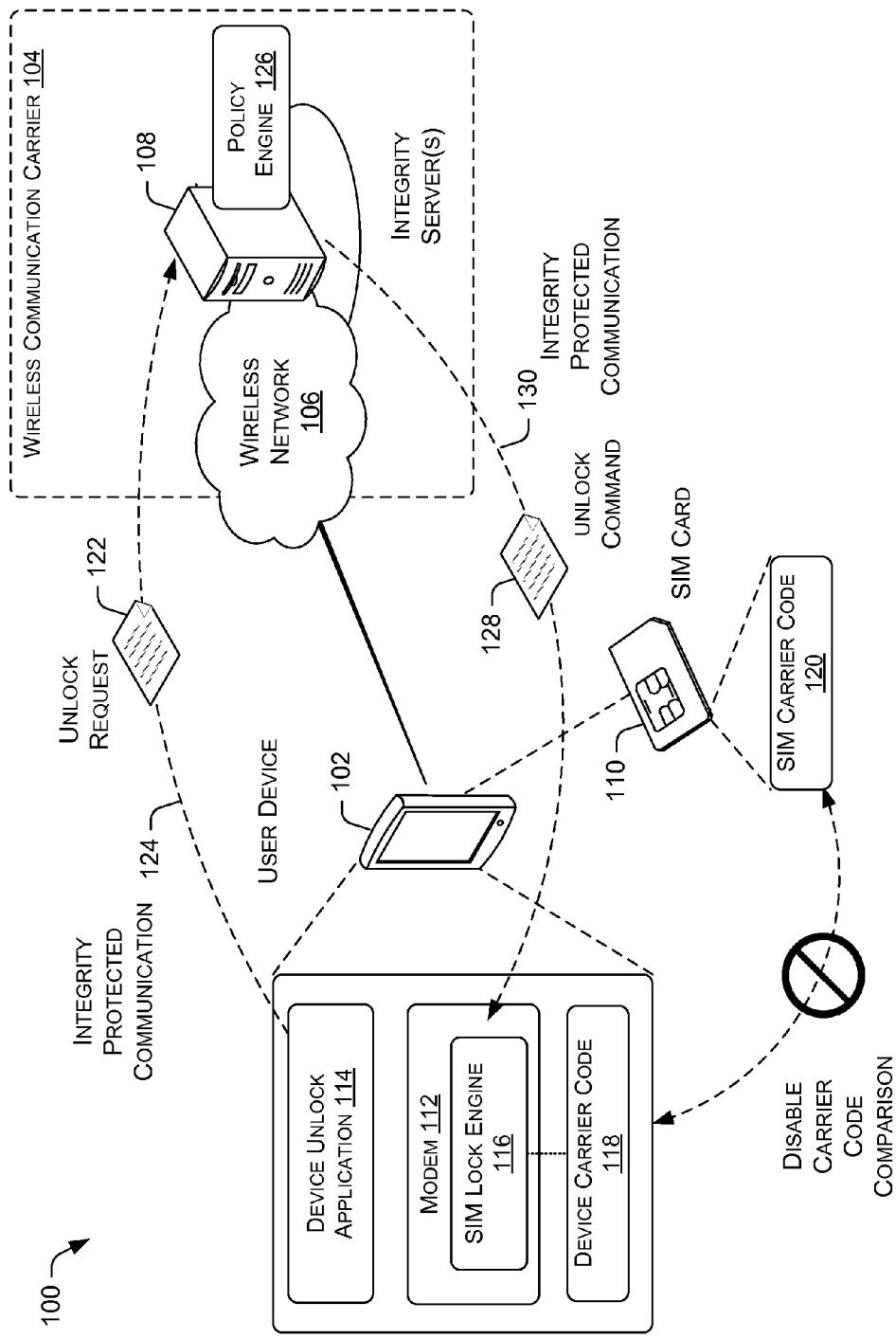
FIG. 1 illustrates an example network architecture for implementing secure remote unlocking of user devices.

This disclosure is directed to techniques for providing a remote unlock function that automatically carrier unlocks user devices. The remote unlock function may unlock a user device from exclusive use on a network of a wireless communication carrier. A user device may be carrier locked to a wireless communication carrier via a subscriber identity module (SIM) lock engine that is located within the modem of the user device.

A carrier code may be permanently embedded in the user device at the time that the user device is manufactured. When a user subsequently signs for service with a wireless communication carrier, a SIM card that provides access to the network of the mobile communication carrier may be installed on the user device. At each boot time of the user device for use, the SIM lock engine of the user device may perform a carrier verification check. The carrier verification check may compare the embedded carrier code against a carrier code that is stored in a SIM card. Thus, if the SIM lock engine determines that the embedded carrier code matches the carrier code stored in the SIM, the SIM lock engine may permit the user device to initiate a normal boot up. Otherwise, the user device is permitted by the SIM lock engine to boot into a limited functionality mode.

In various embodiments, the remote unlock function may unlock a user device from a network of a wireless communication carrier in response to a unlock request. The unlock request may be initiated by a user via a unlock application that is installed on the mobile communication. The unlock request may be received by a policy engine of the wireless communication carrier. The policy engine may perform a unlock eligibility verification. Upon verifying that the user device is eligibility for the carrier unlock, the policy engine may transmit a unlock command to the user device. The unlock command may disable the SIM lock engine from performing the carrier verification check at each boot time of the user device. In some embodiments, the transmission of the unlock request and the unlock command for a user device may be performed using integrity protected communication.

The techniques may provide a fully automated carrier unlock that results in increased convenience for a user of a user device. Instead of waiting for as long as multiple days for a customer service representative to fulfill a carrier unlock request, a user device may be unlocked in a shorter amount of time, e.g., in as short as a few seconds. Further, the techniques do not rely on the use of a generic unlock code that is shared by an entire line of user devices. As a result, misappropriation of such an unlocked code by a malicious third party to perform unauthorized unlocking of user devices may be reduced or eliminated. Additionally, the use of integrity protected communication to transmit the unlock requests and the unlock commands virtually excludes the spoofing of such requests and commands by malicious third parties. The techniques described herein may be implemented in a number of ways. Example implementations are provided below with reference to the following figures.

Example Network Architecture

FIG. 1 illustrates an example architecture 100 for implementing secure remote unlocking of user devices. The architecture 100 may include a user device 102 and a wireless communication carrier 104. The wireless communication carrier 104 may operate a wireless network 106. The wireless network 106 may include base stations and a core network. The base stations may be a part of the access network structure of the wireless network 106. The base stations are responsible for handling voice and data traffic between user devices, such as the user device 102 and the core network. Alternatively, the user device 102 may access the core network via other communication networks of the wireless communication carrier 104 and/or third-party providers that connect to the core network. The core network may provide telecommunication and data communication services to the user devices. For example, the core network may connect the user device 102 to other telecommunication and data communication networks. In various embodiments, the core network may include one or more integrity servers 108.

The user device 102 may be smartphone, a tablet computer, or any other device that is capable of using a SIM card 110 to obtain telecommunication and/or data communication services from the wireless network 106. The user device 102 may include a modem 112 and a device unlock application 114. The modem 112 is a hardware component that enables the user device 102 to perform telecommunication and data communication with the wireless network 106. The modem 112 may include a software SIM lock engine 116. The SIM lock engine 116 is able to access a device carrier code 118 that is embedded in the user device 102 when the device manufactured. Furthermore, the SIM lock engine 116 is also able to access a SIM carrier code 120 that is stored in the SIM card 110.

At each boot time of the user device 102, the SIM lock engine 116 may perform a verification of the device carrier code 118 against the SIM carrier code 120. Accordingly, if the SIM lock engine 116 determines that the device carrier code 118 matches the SIM carrier code 120, the SIM lock engine 116 may permit the user device 102 to initiate a normal boot up. Otherwise, the user device is permitted by the SIM lock engine 116 to boot into a limited functionality mode. For example, the limited functionality mode may at best allow the user device place emergency service calls using the network of the wireless communication carrier.

In various embodiments, a user of the user device 102 may use the device unlock application 114 to initiate a carrier unlock request 122 for the device. The device unlock application 114 may use integrity protected communication 124 to transmit the unlock request 122 to the integrity servers 108. The unlock request 122 may be received by a policy engine 126 that resides on the integrity servers 108. The policy engine 126 may perform a unlock eligibility verification based on information related to the user and the user device 102. Upon verifying that the user device 102 is eligibility for the carrier unlock, the policy engine 126 may transmit a unlock command 128 to the user device 102 via integrity protected communication 130. The integrity protected communication 124 and 130 may be implemented using unique device and application keys that are assigned to a user device 102 prior to the distribution of the device for use by a consumer. The device and application keys may include corresponding public and private keys. The unlock command 128 may disable the SIM lock engine 116 from performing the carrier verification check at each boot time of the user device. As a result, the user device 102 will subsequently boot up and use an available network of a compatible wireless communication carrier regardless of the carrier code of the compatible wireless communication carrier. In various embodiments, the integrity protected communication 124 and the integrity protected communication 130 may be exchanged between the user device 102 and the policy engine 126 via the wireless network 106, a mobile hotspot operated by the wireless telecommunication carrier 104, a third-party data communication network, or any combination thereof.

In some embodiments, the device unlock application 114 on the user device 102 may provide a user interface menu that enables the user to customize the unlock request. For example, the user may designate whether the unlock request is for a permanent carrier unlock or a temporary carrier unlock, i.e., unlock the user device for a time duration. In some embodiments, there may be multiple levels of temporary carrier unlock, in which each level corresponds to a different time duration. Alternatively or concurrently, the user may use the interface menu to designate one or more geographical regions for which carrier unlock is desired, such that the user may use user device with networks of wireless communication carriers that serve such regions. Thus, the customization of the unlock request 122 may result in multiple scenarios of unlock requests, in which each scenario of the unlock requests has a unique combination of factors such as unlock permanency, unlock time duration, unlock geographical region, and/or so forth. In some instances, the user may also use the interface menu to request a cancelation of a carrier unlock for the use device 102, regardless of whether the carrier unlock is temporary or permanent, such that the user device 102 may revert back to a carrier locked state.

The policy engine 126 may use the scenario of the unlock request 122 to determine an amount or types of checks that are performed during the unlock eligibility verification, as each scenario of unlock requests may have a corresponding set of verifications that are to be performed. For example, a request for a temporary carrier unlock for 60 days may result in verification that the user of the user device has no outstanding service bills. In another example, a request for a temporary carrier unlock for 30 days may result in verification that the user is no more than one month behind in paying service bills. In contrast, a request for a permanent carrier unlock may result in verification that the user device is fully paid for and that the user of the user device has no outstanding service bills. Accordingly, a permanent carrier unlock request may result in more verifications than a temporary carrier unlock request.

Example User Device Components

Figure 2:
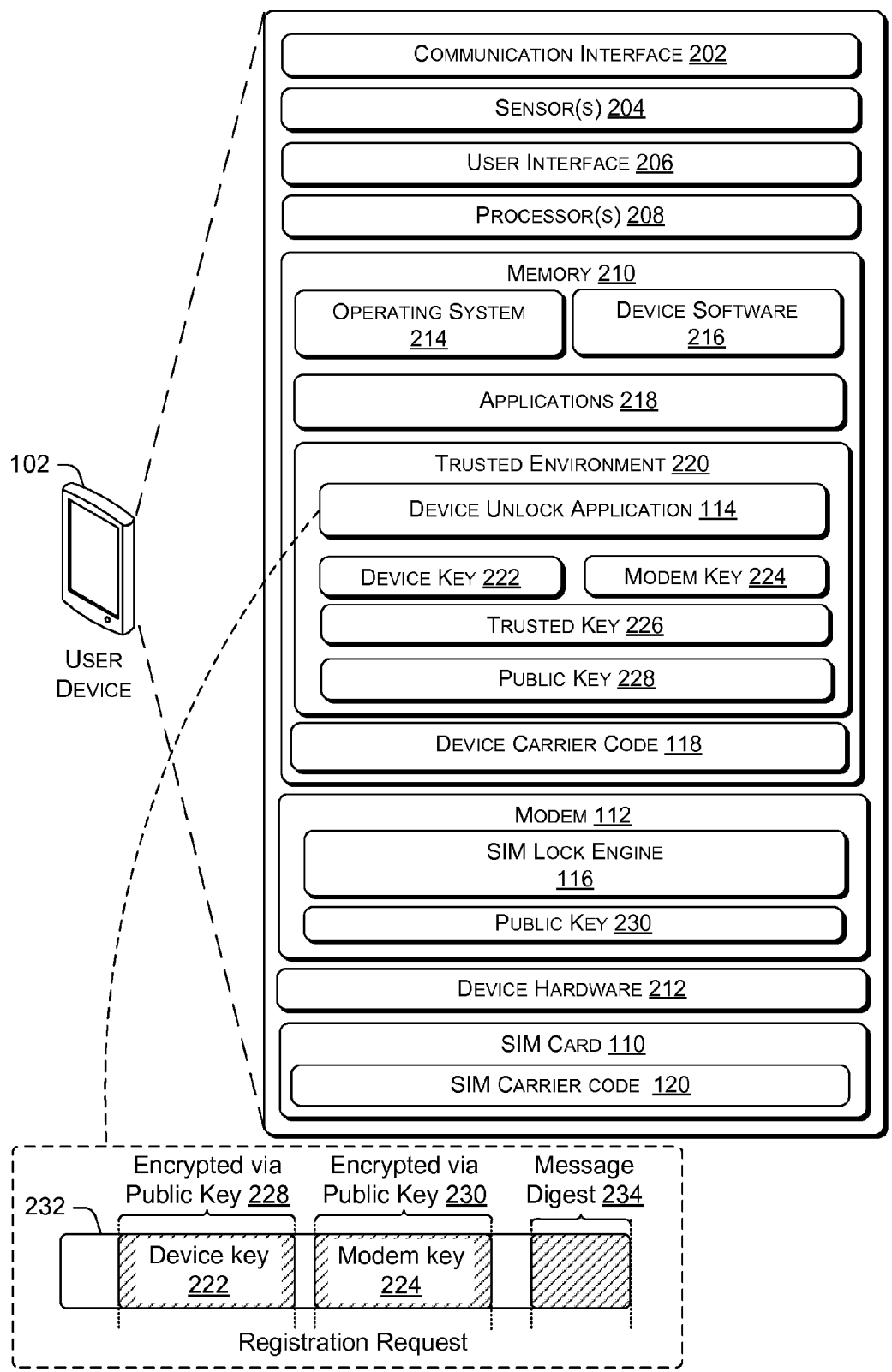
FIG. 2 is a block diagram showing various components of an illustrative user device that supports secure remote unlocking.

FIG. 2 is a block diagram showing various components of an illustrative user device 102 that supports secure remote unlocking. The user device 102 may include a communication interface 202, one or more sensors 204, a user interface 206, one or more processors 208, and memory 210.

The communication interface 202 may include wireless and/or wired communication components that enable the electronic device to transmit or receive voice or data communication via the wireless network 106, as well as other telecommunication and/or data communication networks. The sensors 204 may include a proximity sensor, a compass, an accelerometer, and/or a global positioning system (GPS) sensor. The proximity sensor may detect movement of objects that are proximate the user device 102. The compass, the accelerometer, and the GPS sensor may detect orientation, movement, and geolocation of the user device 102.

The user interface 206 may enable a user to provide inputs and receive outputs from the user device 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 102 may also include the modem 112 other device hardware 214. As described above in FIG. 1, the modem 112 is a hardware component that enables the user device 102 to perform telecommunication and data communication with the wireless network 106. The modem 112 may implement the software SIM lock engine 116. The device hardware 214 may include other hardware that is typically located in a mobile telecommunication device. For example, the device hardware 214 may include signal converters, antennas, hardware decoders and encoders, graphic processors, a SIM card slot, and/or the like that enable the user device 102 to execute applications and provide telecommunication and data communication functions. The SIM card 110 may be inserted into the SIM card slot of the user device 102. The SIM card 110 may contain subscriber identification information and the SIM carrier code 120. Accordingly, the SIM card 110 may enable the user device 102 to obtain telecommunication and/or data communication services from the wireless communication carrier that is identified by the SIM carrier code 120.

The one or more processors 208 and the memory 210 of the user device 102 may implement an operating system 214, device software 216, and one or more applications 218. This software may include routines, program instructions, objects, and/or data structures that perform particular tasks or implement particular abstract data types.

The operating system 214 may include components that enable the user device 102 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem 112 and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 102 and executes the operating system 214 following power up of the device.

The applications 218 may include applications that provide utility, entertainment, and/or productivity functionalities to a user of the user device 102. For example, the applications 218 may include telephony applications, electronic mail applications, remote desktop applications, web browser applications, navigation applications, office productivity applications, multimedia streaming applications, and/or so forth.

The one or more processors 208 and the memory 210 of the user device 102 may further implement a trusted environment 220. The trusted environment 220 is an isolated execution space that is provided by dedicated software and/or hardware of a device. For example, the trusted environment 220 may employ a dedicated memory space or memory chip that is not accessible by applications and/or hardware components not located in the dedicated memory space or memory chip, unless such applications and/or hardware components are provided with special access privileges through secure communication channels. Alternatively or concurrently, the applications that reside in the trusted environment 220 may be executed by a dedicated processor. The isolation of the trusted environment 220 provides a high level of security for the execution code or data stored in the execution space.

In various embodiments, the trusted environment 220 may store the device unlock application 114, a device key 222, a modem key 224, a trusted key 226, and a public key 228 of a public-private key pair. The device key 222 uniquely identifies the user device 102. In some embodiments, the device key 222 may be stored into the trusted environment 220 at the time the device is manufactured. In other embodiments, the device key 222 may be generated at runtime by the device unlock application 114 from a device seed value that is assigned to the user device 102 at the time of manufacture. Likewise, the modem key 224 may uniquely identify the modem 112 installed in the user device 102. In some embodiments, the modem key 224 may be assigned to the modem 112 at the time the modem 112 is manufactured. In other embodiments, the modem key 224 may be generated at runtime by the device unlock application 114 from a modem seed value that is assigned to the modem 112 at the time of manufacture. The trusted key 226 is a unique key that is assigned to the trusted environment 220. The trusted key 226 is known to the manufacturer of the hardware that implements the trusted environment 220. Furthermore, the identity of the user device 102, such as the International Mobile Station Equipment Identity (IMEI) of the user device, may also be known to the manufacturer. In various embodiments, the trusted key 226 and its relationship to the trusted environment 220, as well as its association with the user device 102, is also known to a trusted third-party that may be called upon to validate the trusted key 226. The trusted environment 220 may also store a public key 228, e.g., a public certificate, of a public-private key pair, in which the private key of the public-private key pair is known to the policy engine 126. For example, the public key 228 may be embedded into the dedicated memory space of the trusted environment 220 by the manufacturer of the trusted environment 220. The wireless communication carrier 104, in turn, may obtain the private key that corresponds to the public key 228 from the manufacturer for storage in the integrity servers 108. The memory 210 may further store the device carrier code 118. For example, the device carrier code 118 may be permanently stored in the memory 210 in a non-modifiable format at the time the user device 102 is manufactured.

The modem 112 may store a public key 230, e.g., a public certificate, of a public-private key pair, in which the private key is known to the policy engine 126. For example, the public key 230 may be embedded into the memory of the modem 112 by the manufacturer of the modem 112 at the time of manufacturing. The wireless communication carrier 104, in turn, may obtain the private key that corresponds to the public key 228 from the manufacturer of the modem for storage in the integrity servers 108. In various embodiments, a duplicate copy of the public key 230 may also be stored in the trusted environment 220 for access by the device unlock application 114.

The user of the user device 102 may use the device unlock application 114 to carrier unlock the device 102. At a registration stage, the user may use the device unlock application 114 to register the user device 102 with the policy engine 126, such that the policy engine 126 may unlock the user device 102. In various embodiment, the user may initiate a registration option provided by the device unlock application 114. In turn, the device unlock application 114 may send a registration request 232 to the policy engine 126. The registration request 232 may include the device key 222 that is encrypted using the public key 228 and the modem key 224 that is encrypted using the public key 230. The registration may include other information, such as an identifier of the user device 102, an identifier of the registration request, a time and date that the registration request is created, etc.

The registration request 232 may be integrity protected by the trusted key 226. In various embodiments, the device unlock application 114 may integrity protect the registration request by calculating a message digest 234 for the registration request using the trusted key 226. The device unlock application 114 may further append the message digest 234 to the registration request 232. In this way, registration request 232 may be authenticated based on the trusted key 226. Upon authentication, the policy engine 126 may decrypt the device key 222 and the modem key 224 using the known private keys that correspond to the public keys 228 and 230, such that duplicate copies of the device key 222 and the modem key 224 may be stored in the integrity servers 108.

At a unlock request stage, the device unlock application 114 may provide a user interface menu that enables the user to customize a unlock request, such as the unlock request 122. For example, the user may designate whether the unlock request is for a permanent carrier unlock or a temporary carrier unlock, i.e., unlock the user device for a particular time duration. Alternatively or concurrently, the user may use the interface menu to designate one or more geographical regions for which carrier unlock is desired, such that the user may use the user device with networks of wireless communication carriers that serve such regions. The device unlock application 114 may encapsulate the user requested carrier unlock details into the unlock request 122.

Subsequently, the device unlock application 114 may integrity protect the unlock request 122 using the device key 222. In various embodiments, the device unlock application 114 may integrity protect the unlock request by calculating a message digest of the unlock request 122 using the device key 222. The message digest is further appended by the device unlock application 114 to the unlock request 122. The unlock request 112 including the message digest is then transmitted by the device unlock application 222 to the policy engine 126. In turn, since a duplicate copy of the device key 222 is already known to the policy engine 126, the policy engine 126 may use the duplicate copy of the device key 222 to validate the unlock request 122. Upon validation, the policy engine 126 may determine whether the user device 102 is eligible for a carrier unlock based on the information contained in the unlock request 122.

Upon determining that the user device 102 is eligible for a carrier unlock, the policy engine 126 may send the unlock command 128 to the modem 112 of the user device 102. In various embodiments, the unlock command 128 may include a modem data packet that is integrity protected by an appended message digest that is calculated for the modem data blob using the duplicate copy of the modem key 224. The Furthermore, the unlock command 128 in its entirety may be integrity protected by an appended message digest that is calculated for the unlock command 128 using the duplicate copy of the device key 222. The user device 102 may receive the integrity protected unlock command 128 via the communication interface 202. For example, the communication interface 202 may route the integrity protected unlock command 128 to the modem 112 based on a message header of the integrity protected unlock command 128. Accordingly, once the user device 102 receives the integrity protected unlock command 128, the device unlock application 114 may use the device key 222 to validate the unlock command 128.

The device unlock application 114 may perform the validation by independently computing a verification message digest of the unlock command 128 using the device key 222. The device unlock application 114 may then compare the verification message digest to the appended message digest that is extracted from the unlock command 128. Thus, the device unlock application 114 may determine that the unlock command 128 is valid if the message digest from the unlock command 128 and the verification message digest match. Otherwise, the secure communication module 312 may deem the unlock command 128 to be invalid. Upon validation, the device unlock application 114 may extract the modem data packet from the unlock command 128 and deliver the modem data packet to the modem 112.

The SIM lock engine 116 of the modem 112 may validate the modem data packet using the modem key 224. In various embodiments, the SIM lock engine 116 may perform the validation by independently computing a verification message digest of the modem data packet using the modem key 224. The SIM lock engine 116 may then compare the verification message digest to the appended message digest that is extracted from the modem data packet. Thus, the device unlock application 114 may determine that the modem data packet is valid if the message digest from the modem data packet and the verification message digest match. Otherwise, the SIM lock engine 114 may deem the modem data packet to be invalid.

Upon validation, the SIM lock engine 116 may process the unlock information in the modem data packet. The unlock information may indicate the permanency of the carrier unlock (i.e., temporary vs. permanent), a geographical region of the carrier unlock, a unique identifier of the modem data packet, the identity (e.g., session identifier) of the unlock command 128, the time and date that the modem data packet is generated, and/or so forth. The SIM lock engine 116 may use the identification information to prevent unauthorized replay of a unlock command. For example, the SIM lock engine 116 may automatically discard a modem data packet having a session identifier associated with another unlock command that was previously processed by the SIM lock engine 116. In instances in which the carrier unlock is temporary, the unlock information may indicate the duration of the temporary carrier unlock, a start date and time for the temporary carrier unlock, and/or an end date and time of the temporary carrier unlock.

Accordingly, the implementation of the unlock information may cause the SIM lock engine 116 to cease the execution of carrier code verification, i.e., the matching of the device carrier code 118 to the SIM carrier code 120 at boot time of the user device 102. The cessation of the carrier code verification may be implemented according to the conditions specified by the unlock information in the modem data packet. Additional details regarding the transmission of the registration request 232, the unlock request 122 and the unlock command 128 between the user device 102 and the integrity servers 108 are discussed in FIGS. 4-7.

Example Integrity Server Components

Figure 3:
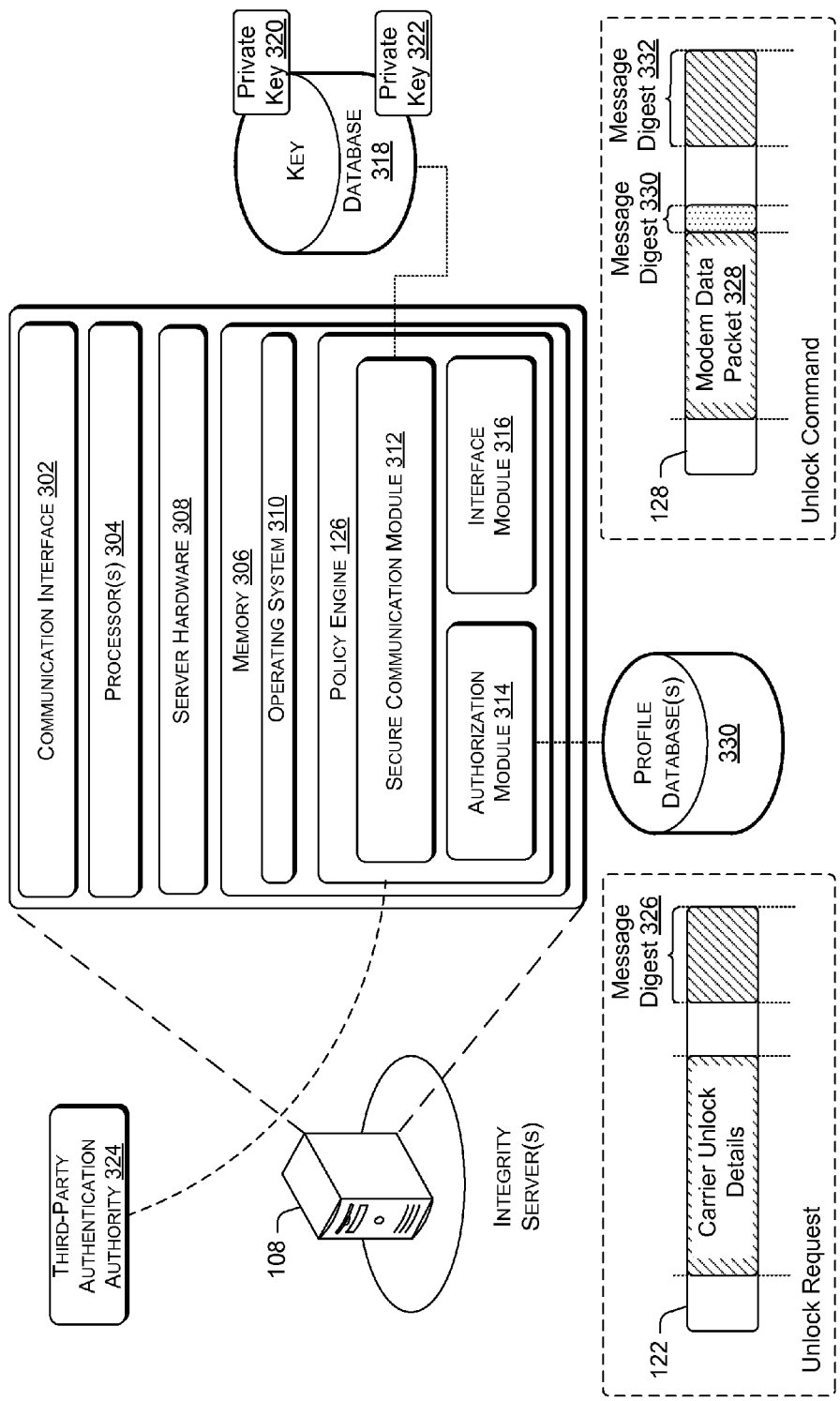
FIG. 3 is a block diagram showing various components of an illustrative integrity server that remotely unlock a user device.

FIG. 3 is a block diagram showing various components of illustrative integrity servers that remotely unlock a user device. The integrity servers may include a communication interface 302, one or more processors 304, memory 306, and server hardware 308. The communication interface 302 may include wireless and/or wired communication components that enable the server to transmit data to and receive data from other networked devices via the wireless network 106. The server hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the integrity servers 108 may implement an operating system 310 and the policy engine 126. The operating system 310 may include components that enable the integrity servers 108 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The policy engine 126 may include a secure communication module 212, an authorization module 314, and an interface module 316. The secure communication module 312 may be responsible for establishing integrity protected communication 124 and 130 with user devices, such as the user device 102. For example, the secure communication module 312 may store the device key 222, the modem key 224, the private key 320, and the private key 322 in a key database 318. The private key 320 may be the counterpart of the public key 228, and the private key 322 may be the counterpart of the public key 230. The key database 318 may also store the associated carrier lock status of each user device. Accordingly, the secure communication module 312 may use the private key 320 and the private key 322 to decrypt encrypted portions, e.g., the device key 222 and the modem key 224, of a registration request. The secure communication module 312 may also have the ability to request verification of a trusted key (e.g., trusted key 226) as belong to a particular user device (e.g., user device 102) from a trusted third-party authentication authority 324. For example, the secure communication module 312 may send a verification request to a verification server at the trusted third-party authentication authority 324. The verification request may include a device identifier of a user device (e.g., the user device 102) and a trusted key (e.g., the trusted key 226). In turn, the trusted third-party authentication authority 324 may send back an indication that the trusted key is valid if the trusted key belongs to the user device. Otherwise, the trusted third-party authentication authority 324 may indicate to the secure communication module 312 that the trusted key is invalid.

Additionally, the secure communication module 312 may perform an integrity validation of a unlock request, such as the unlock request 122 that includes the message digest 326, by independently computing a verification message digest of the unlock request 122 using the corresponding duplicate copy of the device key 222. The secure communication module 312 may then compare the verification message digest to the message digest 326 that is extracted from the unlock request. Thus, the secure communication module 312 may determine that the unlock request 122 is valid if the message digest 326 extracted from the unlock request 128 and the verification message digest match. Otherwise, the secure communication module 312 may deem the unlock request 122 to be invalid.

The secure communication module 312 may also integrity protect a unlock command with a device key of a user device that is the intended recipient of the unlock command. Further, the secure communication module 312 may also protect a modem data packet in the unlock command with the modem key of the user device. For example, the unlock command 128 that is generated by the secure communication module 312 may include a modem data packet 328. The modem data packet 328 may be integrity protected by a message digest 330 that is appended to the modem data packet 328. The message digest 330 may be generated from the modem data packet 328 using a duplicate copy of the modem key 224. Further, the entirety of the unlock command 128 may be integrity protected by a message digest 332 that is appended to the unlock command 128. The message digest 332 may be generated from the unlock command 128 using a duplicate copy of the device key 222. Accordingly, as further described in FIGS. 4, 5, and 7, the secure communication module 312 may use one or more keys in the key database 318 to securely communicate with the user device 102.

The authorization module 314 may validate carrier unlock requests that are received by the policy engine 126, such as the policy engine 126. In various embodiments, the authorization module 314 may initially classify a carrier unlock request into a carrier unlock scenario. The authorization may then check one or more profile databases 320 to determine whether to issue a unlock command to a user device. The profile databases 320 may include a subscriber account database that holds payment information, a user equipment status database, a subscriber information database, etc.

The number and types of profiles databases 320 that are checked may be dependent on the scenario of the unlock request 122. For example, a request for a temporary carrier unlock may result in verification that the user of the user device has no outstanding service bills. In contrast, a request for a permanent carrier unlock may result in verification that the user device is fully paid for and that the user of the user device has no outstanding service bills. Accordingly, the authorization module 314 may issue a unlock command in response to a unlock request when the authorization module 314 determines that an associated user device and/or subscriber is eligible for the carrier unlock. The authorization module 314 may use the communication interface 302 to send unlock commands to the user devices, such as the user device 102.

The interface module 316 may enable a user to access the authorization module 314. In some embodiments, the interface module 316 may generate one or more web pages for accessing functionalities the module. For example, the web pages may be used to override or cancel the distribution of unlock commands, monitor the verifications performed by the authorization module 314, gather statistical data and metrics regarding the unlock requests and unlock commands, update information in the databases, and so forth.

While the policy engine 126 is illustrated as being implemented on the integrity servers 108, the policy engine 126 may be implemented on any other servers of the wireless communication carrier 104 in other embodiments. For example, the policy engine 126 may be implemented on servers that perform core network and/or backhaul functions for the wireless network 106. Further, while the secure communication module 312 is illustrated as an independent component, the module may also be implemented as a part of the policy engine 126 in some embodiments.

Example Processes

FIGS. 4-7 present illustrative processes 400-700 for remotely unlocking user devices. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the architecture 100 of FIG. 1.

Figure 4:
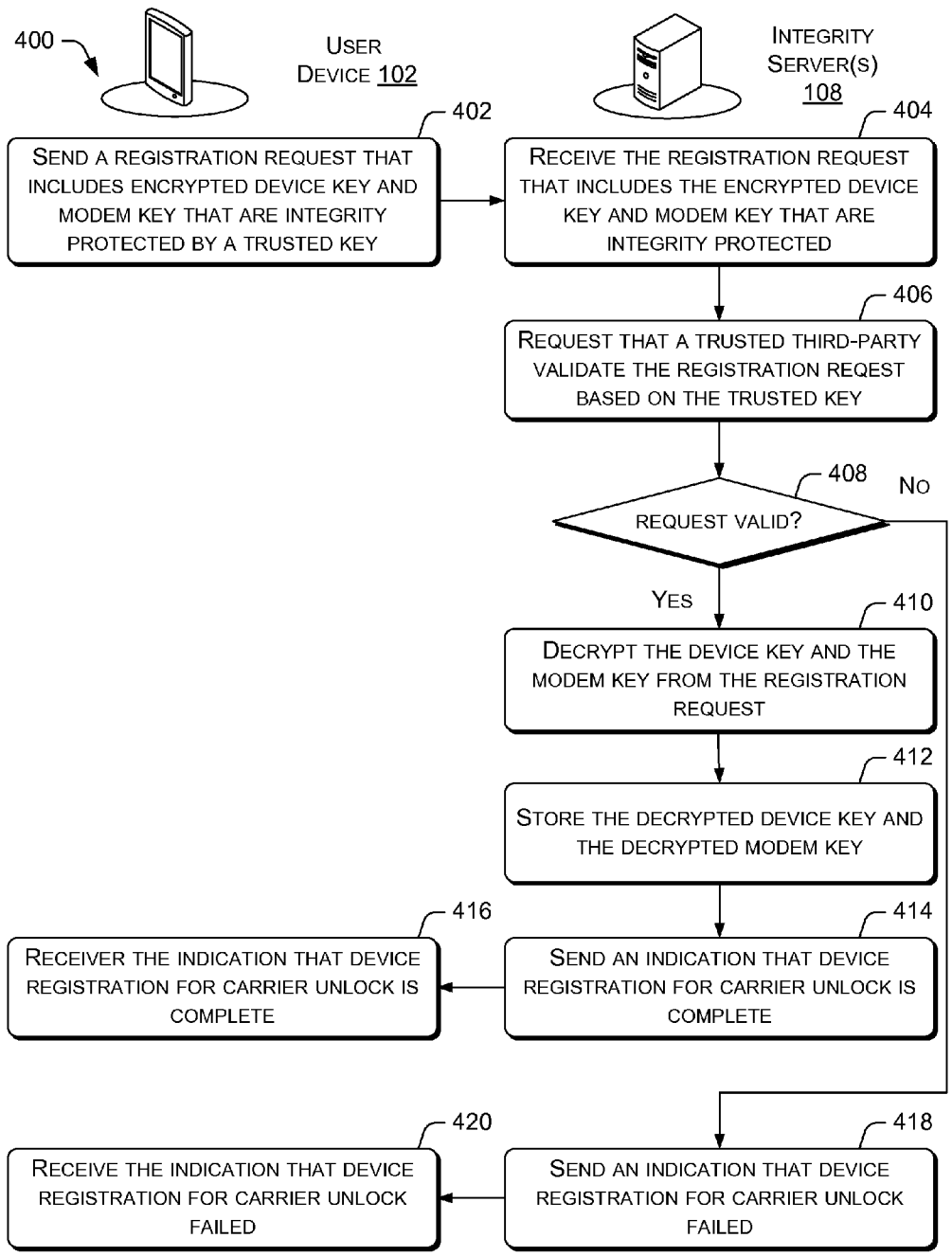
FIG. 4 is a flow diagram of an example process for registering a user device with integrity servers for the purpose of requesting a carrier unlock of the user device from the integrity servers.

FIG. 4 is a flow diagram of an example process 400 for registering a user device with integrity servers for the purpose of requesting a carrier unlock of the user device from the integrity servers. The process 400 may be performed by various components of the user device 102 and the integrity servers 108. In various embodiments, data that is transmitted between the user device 102 and the integrity servers 108 may be routed through the wireless network 106, with or without partial routing through a third-party network.

At block 402, the device unlock application 114 of the user device 102 may send a registration request 232 to the policy engine 126. The registration request 232 may include the encrypted device key 222 and the encrypted modem key 224. The device key 222 may be encrypted using the public key 228, and the modem key 224 may be encrypted using the public key 230. The registration request 232 may be integrity protected by the trusted key 226. The device unlock application 114 may send the registration request 232 in response to an activation of a registration option by the user of the user device 102.

At block 404, the policy engine 126 may receive the registration request that includes the integrity protected registration request 232 that includes the encrypted device key 222 and the encrypted modem key 224. At block 406, the policy engine 126 may request that a trusted third-party validate the registration request 232 based on the trusted key 226. The trusted third-party may determine whether the trusted key 226 correlates with the device identifier to the user device 102 that is included in the registration request 232. Accordingly, if the trusted key 226 correlates with the device identifier, the trusted third-party may determine that the registration request 232 is valid. Otherwise, the trusted third-party may determine that the registration request 232 is invalid. In some embodiments, the trusted third-party may determine that the registration request is valid 232 if there is correlation and no prior registration request is received from the user device 102.

Thus, at decision block 408, if the trusted third-party determines that the registration request 232 is valid ("yes" at decision block 408), the process 400 may proceed to block 410. At block 410, the policy engine 126 may decrypt the device key 222 and the modem key 224 from the registration request 232. In various embodiments, the policy engine 126 may use the private key 320 to decrypt the device key 222 from the registration request 232. Likewise, the policy engine 126 may use the private key 322 to decrypt the modem key 224 from the registration request 232. At block 412, the policy engine 126 may store the decrypted device key 222 and the decrypted modem key 224 in the key database 318 as associated keys for the user device 102.

At block 414, the policy engine 126 may send an indication that device registration for carrier unlock is complete. At block 416, the device unlock application 114 of the user device 102 may receive the indication that the device registration for carrier unlock is complete. In some embodiments, the device unlock application 114 may display the indication via the user interface 206 of the user device 102.

Returning to decision block 408, if the trusted third-party determines that the registration request 232 is invalid ("no" at decision block 408), the process 400 may proceed to block 418. At block 418, the policy engine 126 may send an indication that the device registration for carrier unlock failed. At block 420, the device unlock application 114 of the user device 102 may receive the indication that the device registration for carrier unlock failed. In some embodiments, the device unlock application 114 may display the indication via the user interface 206 of the user device 102.

Figure 5:
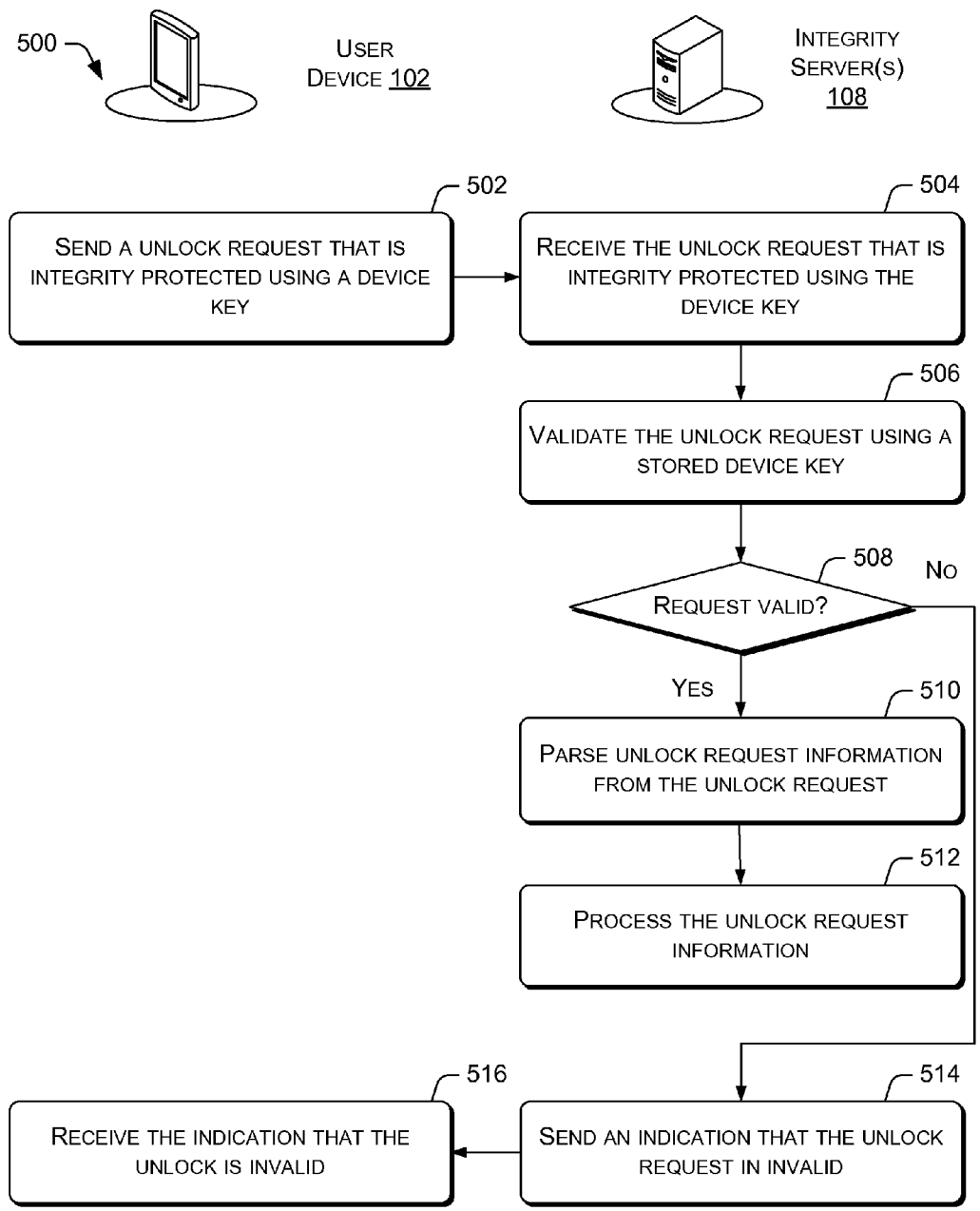
FIG. 5 is a flow diagram of an example process for sending a unlock request from a user device to a policy engine on the integrity servers.

FIG. 5 is a flow diagram of an example process 500 for sending a unlock request from a user device to a policy engine on the integrity servers. The process 500 may be performed by various components of the user device 102 and the integrity servers 108. In various embodiments, data that is transmitted between the user device 102 and the integrity servers 108 may be routed through the wireless network 106, with or without partial routing through a third-party network.

At block 502, the device unlock application 114 may send the unlock request 122 that is integrity protected to the policy engine 126. In various embodiments, the unlock request 122 may be integrity protected using the device key 222. The integrity protection may involve the calculation of the message digest 326 for the unlock command 122 using the device key 222. At block 504, the policy engine 126 may receive the integrity protected unlock request 122.

At block 506, the policy engine 126 may validate the integrity protected unlock request 122 using a stored device key. The stored device key may be a duplicate copy of the device key 222 that is stored at the policy engine 126 during the registration of the user device 102 for carrier unlock. The policy engine 126 may perform the validation by calculating a verification message digest using the copy of the device key 222, and then comparing the verification message digest to the message digest 326. Accordingly, matching message digests may indicate that the unlock request 122 is valid, while non-matching message digests may indicate that the unlock request 122 is invalid.

At decision block 508, if the policy engine 126 determines that the unlock request 122 is valid ("yes" at decision block 508), the process 500 may proceed to block 510. At block 510, the policy engine 126 may parse unlock request information from the unlock request 122. In various embodiments, the unlock request information may include whether unlock is to be permanent or temporary, a unlock duration, a geographical location of unlocking, unlock request identification information, device identification information, and/or so forth.

Returning to decision block 508, if the policy engine 126 determines that the unlock request 122 is invalid ("no" at decision block 508), the process 500 may proceed to block 514. At block 514, the policy engine 126 may send an indication that the unlock request 122 is invalid. At block 516, the device unlock application 114 on the user device 102 may receive the indication that the unlock request 122 is invalid. In some embodiments, the device unlock application 114 may display the indication via the user interface 206 of the user device 102.

Figure 6:
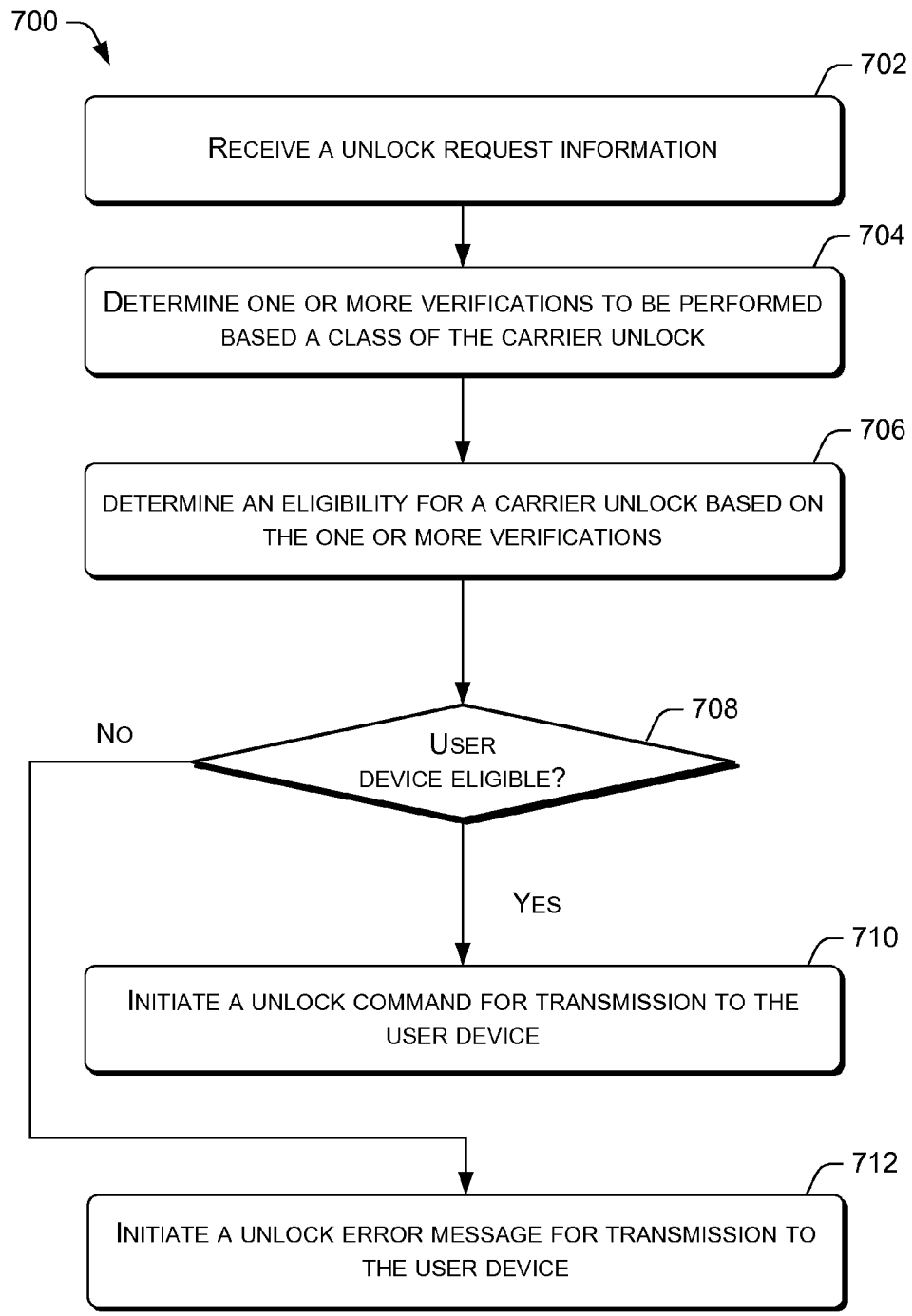
FIG. 6 is a flow diagram of an example process for determining whether a user device is eligible for a carrier unlock.

FIG. 6 is a flow diagram of an example process 600 for determining whether a user device is eligible for a carrier unlock. At block 602, policy engine 126 may receive the unlock request information for the user device 102. The unlock request information may indicate that the unlock request 122 is for a scenario of carrier unlock. For example, the scenario of carrier unlock may be dependent on a combination of a permanency of the carrier unlock request, a particular unlock duration specified in the carrier unlock request, a particular geographical area specified in the carrier unlock request, and/or so forth.

At block 604, the policy engine 126 may determine one or more verifications to be performed based on the scenario of the carrier unlock request. The one or more verifications may be performed using databases that include a subscriber account database that holds payment information, a user equipment status database, a subscriber information database, and/or so forth.

At block 606, the policy engine 126 may determine whether the user device 102 is eligible for a carrier unlock based on the one or more verifications. In various embodiments, the verifications may be performed using the one or more profile databases 320. For example, a request for a temporary carrier unlock may result in verification that the user of the user device has no outstanding service bills. In contrast, a request for a permanent carrier unlock may result in verification that the user device is fully paid for and that the user of the user device has no outstanding service bills.

At decision block 608, if the policy engine 126 determines that the user device 102 is eligible for the carrier unlock ("yes" at decision block 608), the process 600 may proceed to block 610. At block 610, the policy engine 126 may initiate a unlock command 128 for transmission to the user device 102. However, if the policy engine 126 determines that the user device 102 is not eligible for the carrier unlock ("no" at decision block 608), the process 600 may proceed to block 612. At block 612, the policy engine 126 may initiate a unlock error message that is transmitted to the user device 102. In some embodiments, the device unlock application 114 may present the unlock error message on a display of the user device 102.

Figure 7:
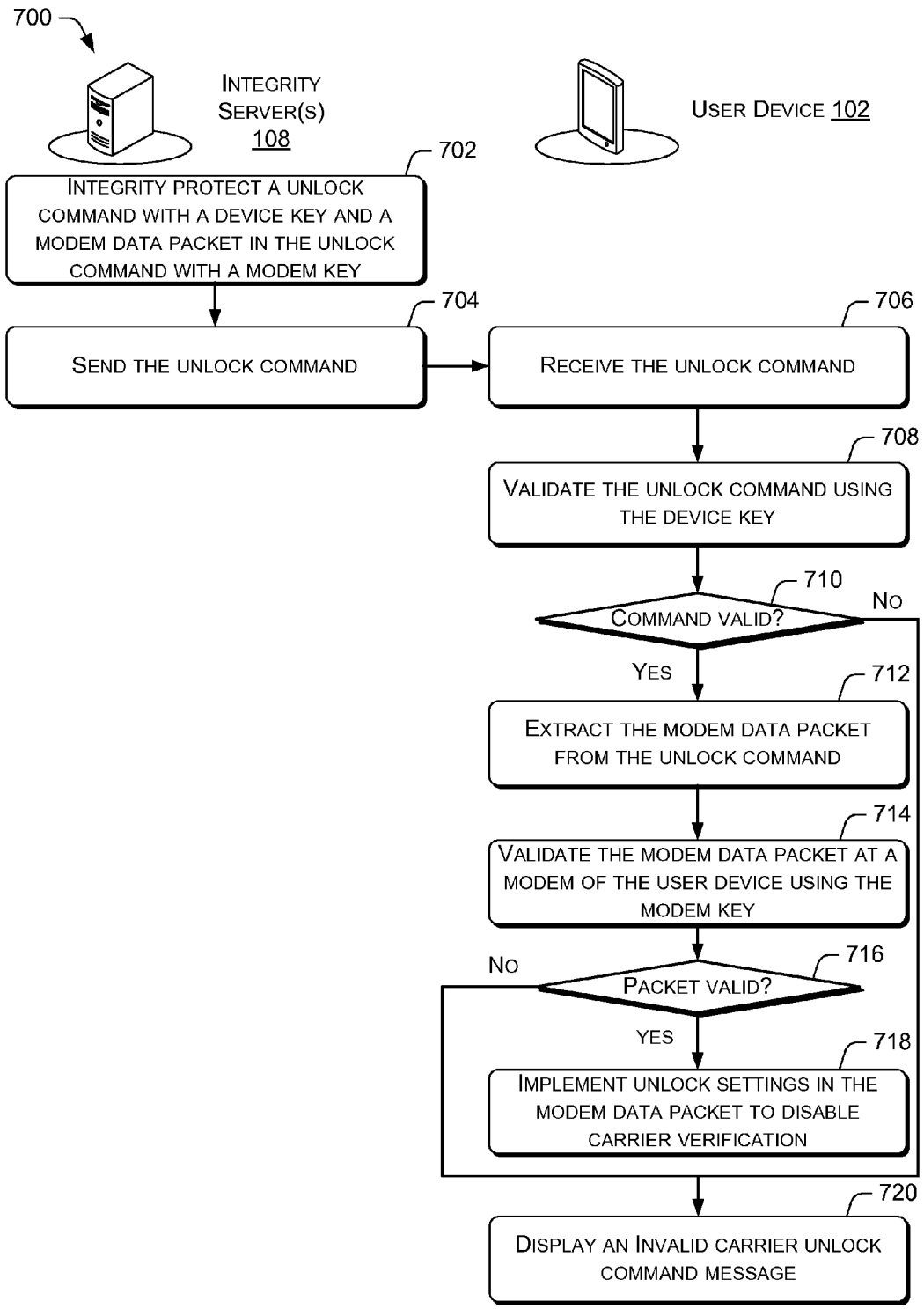
FIG. 7 is a flow diagram of an example process for sending a unlock command from the integrity servers to disable a performance of carrier verification by a user device at device startup.

FIG. 7 is a flow diagram of an example process 700 for sending a unlock command from an integrity server to disable a performance of carrier verification by a user device at device startup. The process 700 may be performed by the user device 102 and the integrity servers 108. In various embodiments, data that is transmitted between the user device 102 and the integrity servers 108 may be routed through the wireless network 106, with or without partial routing through a third-party network.

At block 702, the policy engine 126 on the integrity servers 108 may integrity protect the unlock command 128 with a device key. The device key may be a duplicate copy of the device key 222 that is stored in the key database 318. The integrity protection of the unlock command 128 may involve the calculation of the message digest 332 for the unlock command 128 using the duplicate copy of the device key 222. The unlock command 128 may include a modem data packet 328 that is integrity protected using a modem key. The modem key may be a duplicate copy of the modem key 224 that is stored in the key database 318. The integrity protection of the modem data packet 328 may involve the calculation of the message digest 330 for the modem data packet 328 using the duplicate copy of the modem key 224.

At block 704, the policy engine 126 may send the unlock command 128 to the user device 102. At block 706, the user device 102 may receive the unlock command 128. At block 708, the device unlock application 114 on the user device 102 may validate the unlock command using the device key 222. In various embodiments, the device unlock application 114 may perform the validation by calculating a verification message digest for the unlock command 128 using the device 222, and comparing the verification message digest to the message digest 332. Accordingly, matching message digests may indicate that the unlock command 128 is valid, while non-matching message digests may indicate that the unlock command 128 is invalid.

At decision 710, if the device unlock application 114 determines that the unlock command 128 is valid ("yes" at decision block 710), the process 700 may proceed to block 712. At block 712, the device unlock application 114 may extract the modem data packet 328 from the unlock command 128. In various embodiments, the extraction of the modem data packet 328 may include the extraction of the message digest 330 that is appended to the modem data packet 328.

At block 714, the SIM lock engine 116 of the modem 112 may validate the modem data packet 328 using the modem key 224. In various embodiments, the SIM lock engine 116 may perform the validation by calculating a verification message digest for the modem data packet 328 using the modem key 224, and then comparing the verification message digest to the message digest 330. Accordingly, matching message digests may indicate that the modem data packet 328 is valid, while non-matching message digests may indicate that the modem data packet 328 is invalid. The SIM lock engine 116 may also examine other factors, such as a session identifier of the modem data packet 328, timestamp of the modem data packet 328, etc., to determine whether the modem data packet is valid.

At decision 716, if the SIM lock engine 116 determines that the modem data packet is valid ("yes" at decision block 716), the process 700 may proceed to block 718. At block 718, the SIM lock engine 116 may implement the unlock settings in the modem data packet to disable carrier verification. The unlock settings may disable the performance of carrier verification by the SIM lock engine 116 at boot time of the user device 102. In various embodiments, the unlock settings may include the duration of the temporary carrier unlock, a start date and time for the temporary carrier unlock, and/or an end date and time of the temporary carrier unlock.

Returning to decision block 710, if the SIM lock engine 116 determines that the unlock command 128 is invalid ("no" at decision block 710), the process 700 may proceed to block 720. At block 620, the device unlock application 114 may cause the user device 102 to present an invalid carrier unlock command message on a display of the user device 102. Returning to decision block 720, if the SIM lock engine 116 determines that the modem data packet 328 is invalid ("no" at decision block 720), the process 700 may proceed to block 720. At block 720, the SIM lock engine 116 may cause the user device 102 to present an invalid carrier unlock command message on a display of the user device 102. In some embodiments, the device unlock application 114 or the SIM lock engine 116 may send an invalidity indicator to the policy engine 126. The invalidity indicator may cause the policy engine 126 to resend a unlock command to the user device 102.

The techniques may provide a fully automated carrier unlock that results in increased convenience for a user of a user device. Instead of waiting for as long as multiple days for a customer service representative to fulfill a carrier unlock request, a user device may be unlocked in a shorter amount of time, e.g., in as short as a few seconds. The automated carrier unlock may also relieve the customer service representative from having to perform individual checks for multiple databases to determine carrier unlock eligibility. Further, the techniques do not rely on the use of a generic unlock code that is shared by an entire line of user devices. As a result, misappropriation of such an unlocked code by a malicious third party to perform unauthorized unlocking of user devices may be reduced or eliminated. Additionally, the use of integrity protected communication to transmit the unlock requests and the unlock commands virtually excludes the spoofing of such requests and commands by malicious third parties.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving a carrier unlock request for a user device;

determining one or more verifications to be performed based at least on an unlock scenario requested by the carrier unlock request for the user device;

performing the one or more verifications to determine whether the user device is eligible for a carrier unlock; and sending an unlock command to the user device in response to determining that the user device is eligible for the carrier unlock, the unlock command to disable a comparison of a device carrier code stored in a memory of the user device to a subscriber identity module (SIM) carrier code stored in a SIM card of the user device, wherein the comparison of the device carrier code stored in the memory of the user device to the SIM carrier code stored in the SIM card is for determining whether the user device is able to initiate a normal boot up to use a wireless network of a wireless communication carrier identified by the SIM carrier code or boot into a limited functionality mode.

2. The one or more non-transitory computer-readable media of claim 1, further comprising sending an unlock error message to the user device in response to determine that the user device is ineligible for the carrier unlock.

3. The one or more non-transitory computer-readable media of claim 1, further comprising:

receiving a carrier unlock registration request from a device unlock application on the user device, the unlock request including an encrypted device key of the user device and an encrypted modem key of a modem in the user device that are integrity protected by a trusted key of a trusted environment of the user device; and decrypting the encrypted device key into a decrypted device key and the encrypted modem key into a decrypted modem key in response to a validation of the trusted key by a trusted third-party authority as belonging to the user device.

4. The one or more non-transitory computer-readable media claim 3, wherein the receiving includes receiving the carrier unlock request that is integrity protected by the device key, further comprising using the decrypted device key to validate the carrier unlock request that is integrity protected by the device key.

5. The one or more non-transitory computer-readable media of claim 3, further comprising providing integrity protection to the unlock command via the decrypted device key and integrity protection to a modem data packet in the unlock command via the decrypted modem key prior to the sending of the unlock command, the integrity protection of the unlock command to be validated by the device unlock application on the user device using the device key, and integrity protection of the modem data packet to be validated by an application in a modem on the user device using the modem key.

6. The one or more non-transitory computer-readable media of claim 5, wherein the modem data packet includes information that permanently disables the comparison of the device carrier code to the SIM carrier code when the unlock scenario includes a permanent carrier unlock of the user device, or temporarily disables the comparison of the device carrier code to the SIM carrier code for a predetermined period of time when the unlock scenario includes a temporary carrier unlock of the user device.

7. The one or more non-transitory computer-readable media of claim 1, wherein the determining includes determining the one or more of a plurality of verifications to be performed based on a particular scenario of the carrier unlock, the verifications including verifying at least one of whether the user device is fully paid for, whether a user of the user device has any outstanding service bills, or whether the user is more than a predetermined number of months behind on paying service bills.

8. The one or more non-transitory computer-readable media of claim 1, wherein the unlock scenario is based on factors that include at least one of whether the carrier unlock is a permanent carrier unlock of the user device or a temporary carrier unlock of the user device, a geographical region specified by the carrier unlock, or an unlock time duration when the carrier unlock is the temporary carrier unlock.

9. The one or more non-transitory computer-readable media of claim 8, wherein the performing includes performing at least one verification for the permanent carrier unlock that is not performed for the temporary carrier unlock of the user device.

10. A computer-implemented method, comprising:
receiving a carrier unlock registration request from a device unlock application on a user device at a server that registers the user device with the server for receiving remote carrier unlock from the server, the carrier unlock registration request including at least an encrypted device key of the user device that is integrity protected by a trusted key assigned to a trusted environment of the user device that is an isolated execution space on the user device, the trusted key being inaccessible to applications stored on the user device that are outside of the isolated execution space and lack privilege to access the isolated execution space via a secure communication channel; and decrypting, at the server, the encrypted device key into a decrypted device key in response to a validation of the trusted key by a trusted third-party authority as belonging to the user device;
receiving, at the server, a carrier unlock request for the user device that is integrity protected by the device key;
validating, at the server, the carrier unlock request that is integrity protected by the device key using the decrypted device key; and
determining, at the server, whether to fulfill the carrier unlock request following a validation of the carrier unlock request via the decrypted device key.

11. The computer-implemented method of claim 10, wherein the determining includes:
ascertaining one or more verifications to be performed by a policy engine based at least on an unlock scenario requested by the carrier unlock request for the user device;
performing the one or more verifications to determine whether the user device is eligible for a carrier unlock; and
initiating an unlock command for transmission to the user device in response to determining that the user device is eligible for the carrier unlock, the unlock command to disable a comparison of a device carrier code of the user device to a subscriber identity module (SIM) carrier code stored in a SIM card of the user device.

12. The computer-implemented method of claim 11, wherein the unlock request further includes an encrypted modem key of a modem in the user device that is integrity protected by the trusted key, and the decrypting further includes decrypting the encrypted modem key into a decrypted modem key in response to a validation of the trusted key by the trusted third-party authority as belonging to the user device, further comprising:
providing, at the server, integrity protection to the unlock command via the decrypted device key and integrity protection to a modem data packet in the unlock command via the decrypted modem key, the integrity protection of the unlock command to be validated by the device unlock application on the user device using the device key, and the integrity protection modem data packet to be validated by an application in a modem on the user device using the modem key; and
sending, from the server, the unlock command to the user device.

13. The computer-implemented method of claim 11, further comprising initiating an unlock error message for transmission to the user device in response to determine that the user device is ineligible for the carrier unlock.

14. The computer-implemented method of claim 11, wherein the unlock scenario includes a permanent carrier unlock of the user device or a temporary carrier unlock of the user device.

15. The computer-implemented method of claim 14, wherein the initiating includes initiating an unlock command that temporarily disables the comparison of the device carrier code to the SIM carrier code for a predetermined period of time when the unlock scenario includes the temporary carrier unlock of the user device.

16. The computer-implemented method of claim 11, wherein the performing includes performing at least one of verifying that payments for a mobile communication service used by the user device are paid up-to-date or verifying that the user device is paid-in-full.

17. A server, comprising:

one or more processors; and memory having instructions stored therein, the instructions, when executed by the one or more processors, cause the one or more processors to perform acts comprising:

receiving a carrier unlock request for a user device that is initiated by a device unlock application on the user device;

determining one or more verifications to be performed based at least on whether a permanent carrier unlock or a temporary carrier unlock is requested by the carrier unlock request for the user device;

performing the one or more verifications to determine whether the user device is eligible for a carrier unlock; and sending an unlock command to the user device in response to determining that the user device is eligible for the carrier unlock, the unlock command to disable a comparison of a device carrier code stored in the user device to a subscriber identity module (SIM) carrier code stored in a SIM card of the user device, wherein disabling the comparison of the device carrier code stored in the memory of the user device and the SIM carrier code stored in the SIM in response to the unlock command allows the user device to use a wireless network of a wireless communication carrier regardless of a carrier code of the wireless communication carrier.

18. The server of claim 17, wherein the sending includes sending an unlock command that temporarily disables the comparison of the device carrier code to the SIM carrier code for a predetermined period of time when the carrier unlock request is for a temporary carrier unlock of the user device.

19. The server of claim 17, wherein the performing includes performing at least one of verifying that payments for a mobile communication service used by the user device are paid up-to-date or verifying that the user device is paid-in-full.

20. The server of claim 17, wherein the performing includes performing at least one verification for the permanent carrier unlock that is not performed for the temporary carrier unlock of the user device.

* * * * *